(12) United States Patent
Henzler

(10) Patent No.: US 6,398,632 B1
(45) Date of Patent: Jun. 4, 2002

(54) WORKPIECE HOLDER

(75) Inventor: Bernhard Henzler, Neckartenzlingen (DE)

(73) Assignee: Kadia-Produktion GmbH & Co., Nurtingen (DE)

( * ) Notice: Subject to any disclaimer, the term of this patent is extended or adjusted under 35 U.S.C. 154(b) by 0 days.

(21) Appl. No.: 09/541,674

(22) Filed: Mar. 31, 2000

(30) Foreign Application Priority Data

Apr. 17, 1999 (DE) ................................... 299 06 923 U

(51) Int. Cl.[7] .............................................. B24B 41/06
(52) U.S. Cl. ...................................... 451/364; 451/381
(58) Field of Search ................................ 451/364, 381, 451/439, 27; 269/909, 47, 52, 53; 82/1.2, 169

(56) References Cited

U.S. PATENT DOCUMENTS

| | | | | |
|---|---|---|---|---|
| 2,584,611 A | * | 2/1952 | Peden | .......................... 29/235 |
| 3,747,445 A | * | 7/1973 | Piotrowski et al. | ............ 82/44 |
| 4,366,735 A | * | 1/1983 | Dubois, Sr. | ..................... 82/44 |
| 4,817,340 A | * | 4/1989 | Culp | ......................... 51/241 S |
| 5,934,724 A | | 8/1999 | Ferriere | |

* cited by examiner

Primary Examiner—Timothy V. Eley
Assistant Examiner—Dung Van Nguyen
(74) Attorney, Agent, or Firm—Jones, Tullar & Cooper, P.C.

(57) ABSTRACT

An insertion arbor used in device for machining a workpiece. The workpiece includes a centered middle bore, a plurality of other bores and an equal plurality of fabrication bores. Each of the other bores defining an area of increased radius. The other bores define a axis, which axes do not intersect at one point. The insertion arbor is insertable through a fabrication bore and extends to the area of increased radius of the associated other bore.

3 Claims, 2 Drawing Sheets

WORKPIECE HOLDER

BACKGROUND OF THE INVENTION

The present invention relates to a workpiece holder for a workpiece.

Figure 1:
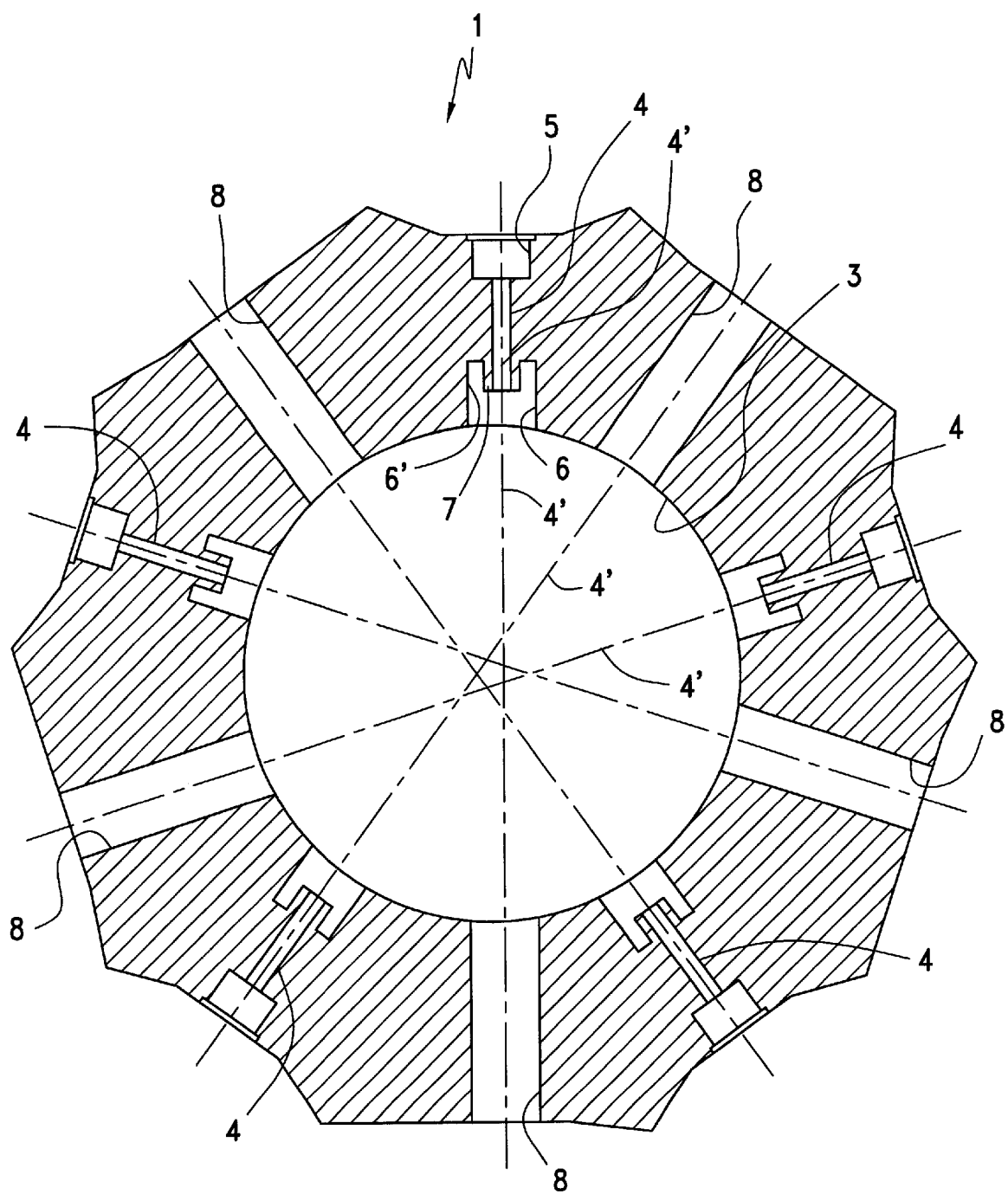

The workpiece 1 in accordance with FIG. 1 is, for example, a pump housing, through which a central bore 3 with an axis extending perpendicularly with respect to the drawing plane passes. The object of machining, for which a workpiece holder is to be created, lies in machining the bores 4, five in number in the exemplary embodiment in accordance with FIG. 1, in which—in a connection not of further interest here—pump pistons, for example, are guided. The bores 4 must be exactly machined, in particular honed. The unusual feature of the positioning of these bores 4 in the workpiece 1, as a result of which also arises the difficulty of providing a suitable holder of the workpiece 1, lies in that the axes 4' of the bores 4 do not intersect in one point. If this would be the case, and this point would be located on the axis of the bore 3, holding on an arbor, which would have to be inserted into the bore 3, would be relatively simple. But this is not the case. For each machining process of each bore 4 it is necessary to provide a fresh positioning and adjustment of the workpiece in relation to a spindle in which the honing tool is seated. The honing tool is inserted into the bores 4 from the outside (in FIG. 1).

Projections 5 adjoin the bores 4 in the direction toward the exterior. Towards the interior, i.e. toward the bore 3, areas 6 of larger radius adjoin, whose outer areas 6' again extend like an annular groove around the areas 7, which respectively surround the inner end of the bores 4. The oppositely located fabrication bores 8 are required in order to be able to apply the areas 6 and 6' from the direction of the interior of the bore 3. This embodiment of the inner end of the bore 4 is a condition of the later function of the workpiece 1.

Up to now it has been necessary to produce a separate workpiece holder for each workpiece of this type, which was determined by the diameter of the bore 3, the position and number of the bores 4, as well as the thickness of the housing (perpendicularly with respect to the plane of FIG. 1), which would have to be adjustable and settable by means of special adjusting devices in such a way that the bores 4 are respectively exactly underneath the honing spindle. This was very complicated from one individual case to the other individual case because of the respectively different position of the axes of the bores 4—in relation to the axis of the bore 3—.

Figure 2:
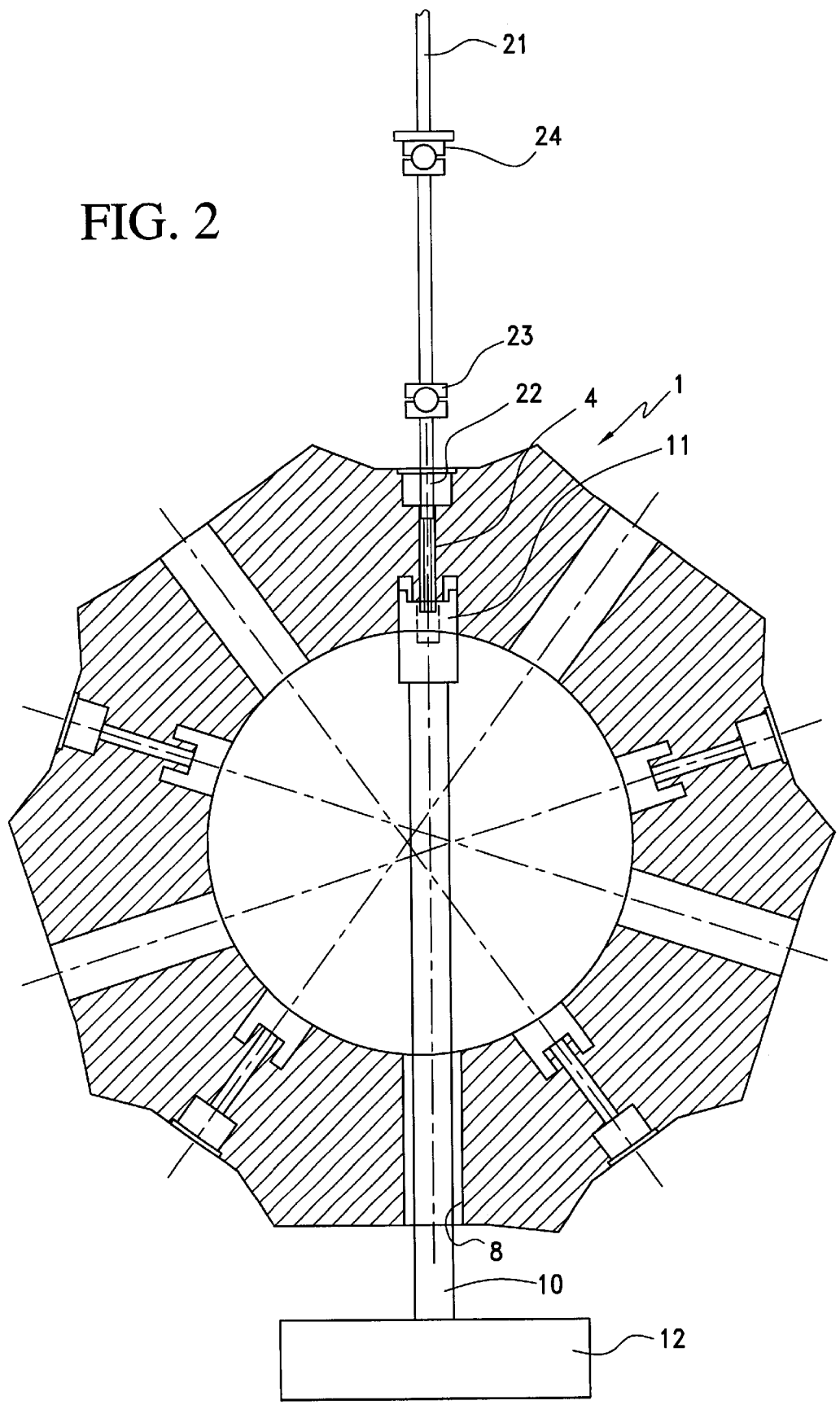

It was therefore an object to provide a simplified device for holding such workpieces. An exemplary embodiment of a simplified device is represented in FIG. 2.

The surprisingly simple solution consists in passing an insertion arbor 10 through the fabrication bores 8. The insertion arbor 10 is provided with a head 11, which fits into the cylindrical area 6 surrounding the inner end of the bore 4 and is inserted into it. An exact centering of the bore 4 in relation to the insertion arbor 10, or respectively to a base element 12, which is used for manipulation in a holding fixture, results in this way.

The honing tool is identified by 20, whose upper end 21 is received in a spindle (not shown) and rotated. In order to assure in the usual way a force-free alignment of the axis of the lower element 22 of the honing tool, which is required for the exact alignment of the honing tool in the bore 4, two universal joints 23, 24 are provided—in a manner known per se—in the honing tool 20. With bores 4 of narrow diameter, this is a single strip honing tool.

This simple insertion arbor 10 can be used for all bores 4 and 8. All that is required is a suitable gripper (for example a robot), which grasps the workpiece 1 after machining of a bore 4 is completed, and reseats it on the fabrication bore 8 associated with the next bore 4. This is possible in a simple way. Thus, complicated positioning and adjusting devices, including possible gimbal-mounting of the workpiece receiving devices are superfluous. Manipulation for machining of such bores 4 is considerably simplified and can be automated.

What is claimed is:

1. A device for machining workpieces, the workpiece having a centered middle bore, a plurality of other bores to be machined each defining an axis which axes do not intersect at one point, each of said plurality of other bores defining an area of increased radius, and an equal plurality of fabrication bores each defining an axis which aligns with the defined axis of a respective one of said other bores, the device comprising: an insertion arbor having a head at one end; a honing tool; and means for aligning the honing tool in a respective one of said other bores when said insertion arbor extends through a respective one of said fabrication bores such that said head engages the area of increased radius of said respective one of said other bores aligned with said fabrication bore through which said insertion arbor extends.

2. The device as defined in claim 1, wherein said means for aligning includes a pair of universal joints.

3. The device as defined in claim 1, further comprising: a base element situated at the other end of said insertion arbor.

\* \* \* \* \*